US010917416B2

(12) United States Patent
Chelarescu et al.

(10) Patent No.: US 10,917,416 B2
(45) Date of Patent: Feb. 9, 2021

(54) SERVICE IDENTIFICATION OF RANSOMWARE IMPACTED FILES

(71) Applicant: Microsoft Technology Licensing, LLC, Redmond, WA (US)

(72) Inventors: Filip Chelarescu, Kirkland, WA (US); Parthipan Thayanithy, Redmond, WA (US); Meir E. Abergel, Redmond, WA (US); Benjamin N. Truelove, Lynnwood, WA (US); Steven J Bailey, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 15/941,710

(22) Filed: Mar. 30, 2018

(65) Prior Publication Data

US 2019/0306179 A1  Oct. 3, 2019

(51) Int. Cl.
*H04L 29/06* (2006.01)
*G06F 16/182* (2019.01)
*G06F 21/56* (2013.01)

(52) U.S. Cl.
CPC ........ *H04L 63/1416* (2013.01); *G06F 16/182* (2019.01); *G06F 21/56* (2013.01); *G06F 21/565* (2013.01); *H04L 63/0428* (2013.01); *H04L 63/14* (2013.01)

(58) Field of Classification Search
CPC . H04L 63/1416; H04L 63/14; H04L 63/0428; G06F 21/565; G06F 21/56; G06F 16/182
See application file for complete search history.

(56) References Cited

U.S. PATENT DOCUMENTS 7,624,443 B2    11/2009  Kramer et al.
7,756,834 B2 *   7/2010  Masters ............... G06F 21/568
                                                    707/640

(Continued)

FOREIGN PATENT DOCUMENTS

| CN | 106570396 A   | 4/2017 |
| WO | 2017053745 A1 | 3/2017 |
| WO | 2018004891 A1 | 1/2018 |

OTHER PUBLICATIONS

"Client Server Security", Retrieved from: http://docs.trendmicro.com/all/smb/css/v3.6/en-us/css_3.6_gsg.pdf, Mar. 1, 2007, 93 Pages.

(Continued)

*Primary Examiner* — J. Brant Murphy
(74) *Attorney, Agent, or Firm* — Schwegman Lundberg & Woessner, P.A.

(57) ABSTRACT

A cloud storage server receives a request from a client device to store a file. The cloud storage server stores the file in a storage device of the cloud storage server. The cloud storage server determines features of the server-stored file and detects ransomware activity based on the features of the server-stored file. The cloud storage server sends a notification of the ransomware activity to the client device. The client device confirms the presence or an absence of the ransomware activity in the server-stored file. The cloud storage server updates an operation of the detection of the ransomware activity based on the received ransomware confirmation.

18 Claims, 8 Drawing Sheets

(56) References Cited

U.S. PATENT DOCUMENTS

| | | | |
|---|---|---|---|
| 7,784,098 B1* | 8/2010 | Fan | G06F 11/1471 726/24 |
| 8,468,604 B2* | 6/2013 | Claudatos | G06F 21/568 726/24 |
| 8,484,737 B1 | 7/2013 | Swift et al. | |
| 8,667,583 B2* | 3/2014 | Polyakov | G06F 21/568 726/22 |
| 8,813,222 B1* | 8/2014 | Codreanu | G06F 21/56 726/22 |
| 8,875,294 B2* | 10/2014 | Golavanov | G06F 21/564 726/22 |
| 8,881,282 B1* | 11/2014 | Aziz | G06F 21/554 726/24 |
| 9,317,686 B1* | 4/2016 | Ye | G06F 11/1461 |
| 9,405,902 B1 | 8/2016 | Xavier | |
| 9,411,955 B2 | 8/2016 | Jakobsson | |
| 9,514,309 B1* | 12/2016 | Mann | G06F 21/60 |
| 9,680,845 B2* | 6/2017 | Langton | G06F 21/53 |
| 9,734,337 B1* | 8/2017 | Patton | G06F 21/568 |
| 9,756,061 B1* | 9/2017 | Roeh | H04L 63/1416 |
| 9,792,436 B1* | 10/2017 | Sankruthi | G06F 21/64 |
| 9,838,405 B1* | 12/2017 | Guo | H04L 63/1416 |
| 9,852,289 B1* | 12/2017 | Mann | G06F 21/60 |
| 10,007,795 B1* | 6/2018 | Chung | G06F 21/568 |
| 10,009,360 B1* | 6/2018 | Todd | H04L 63/1416 |
| 10,055,582 B1* | 8/2018 | Weaver | G06N 20/00 |
| 10,140,454 B1* | 11/2018 | Spath | G06F 21/577 |
| 10,187,410 B2 | 1/2019 | Greenberg et al. | |
| 10,409,986 B1* | 9/2019 | Natanzon | G06F 21/56 |
| 10,685,114 B2* | 6/2020 | Scaife | G06F 21/6218 |
| 2006/0137010 A1* | 6/2006 | Kramer | G06F 21/554 726/22 |
| 2007/0006304 A1* | 1/2007 | Kramer | G06F 21/55 726/22 |
| 2011/0078497 A1 | 3/2011 | Lyne et al. | |
| 2011/0082838 A1* | 4/2011 | Niemela | G06F 11/1458 707/654 |
| 2012/0124007 A1* | 5/2012 | Sten | G06F 11/1448 707/685 |
| 2013/0024435 A1 | 1/2013 | Poirier et al. | |
| 2013/0067576 A1* | 3/2013 | Niemela | G06F 21/568 726/24 |
| 2013/0086683 A1* | 4/2013 | Thomas | G06F 21/00 726/24 |
| 2014/0047544 A1* | 2/2014 | Jakobsson | G06F 21/55 726/23 |
| 2014/0130161 A1* | 5/2014 | Golovanov | G06F 21/564 726/23 |
| 2015/0172304 A1* | 6/2015 | Kleczynski | H04L 63/1416 726/23 |
| 2015/0178171 A1 | 6/2015 | Bish et al. | |
| 2016/0124665 A1 | 5/2016 | Jain et al. | |
| 2016/0164894 A1* | 6/2016 | Zeitlin | H04L 63/1416 726/23 |
| 2016/0294851 A1* | 10/2016 | Langton | H04L 63/0227 |
| 2017/0020353 A1 | 1/2017 | Park et al. | |
| 2017/0140156 A1* | 5/2017 | Gu | G06F 11/14 |
| 2017/0177867 A1 | 6/2017 | Crofton et al. | |
| 2017/0180394 A1 | 6/2017 | Crofton et al. | |
| 2017/0206353 A1* | 7/2017 | Jai | G06F 21/565 |
| 2017/0223031 A1* | 8/2017 | Gu | H04L 63/1416 |
| 2017/0270293 A1* | 9/2017 | Gu | G06F 21/54 |
| 2017/0324755 A1* | 11/2017 | Dekel | H04L 63/145 |
| 2017/0329965 A1* | 11/2017 | Dodson | G06F 21/554 |
| 2017/0364681 A1 | 12/2017 | Roguine et al. | |
| 2017/0371547 A1 | 12/2017 | Fruchtman et al. | |
| 2018/0007069 A1* | 1/2018 | Hunt | H04L 63/1416 |
| 2018/0018458 A1* | 1/2018 | Schmugar | G06F 21/566 |
| 2018/0024893 A1* | 1/2018 | Sella | G06F 11/1458 707/648 |
| 2018/0027009 A1 | 1/2018 | Santos et al. | |
| 2018/0034835 A1 | 2/2018 | Iwanir et al. | |
| 2018/0048658 A1* | 2/2018 | Hittel | H04L 63/1433 |
| 2018/0101678 A1* | 4/2018 | Rosa | G06F 21/562 |
| 2018/0181761 A1* | 6/2018 | Sinha | G06F 21/568 |
| 2018/0189488 A1 | 7/2018 | Arora et al. | |
| 2018/0189490 A1 | 7/2018 | Maciejak et al. | |
| 2018/0203997 A1 | 7/2018 | Charters et al. | |
| 2018/0204000 A1 | 7/2018 | Charters et al. | |
| 2018/0211038 A1* | 7/2018 | Breiman | G06F 21/602 |
| 2018/0212987 A1 | 7/2018 | Tamir et al. | |
| 2018/0248896 A1* | 8/2018 | Challita | G06F 21/554 |
| 2018/0293379 A1* | 10/2018 | Dahan | G06F 21/554 |
| 2018/0357133 A1* | 12/2018 | Strogov | G06F 11/1451 |
| 2018/0375826 A1* | 12/2018 | Chang | G06F 11/14 |
| 2019/0065745 A1 | 2/2019 | Araujo et al. | |
| 2019/0109870 A1 | 4/2019 | Bedhapudi et al. | |
| 2019/0130097 A1* | 5/2019 | Berler | G06F 21/554 |
| 2019/0138727 A1* | 5/2019 | Dontov | H04L 63/1408 |
| 2019/0158512 A1 | 5/2019 | Zhang | |
| 2019/0201597 A1 | 7/2019 | Shelton et al. | |
| 2019/0205530 A1 | 7/2019 | Brown | |
| 2019/0228148 A1* | 7/2019 | Pohl | G06F 3/0659 |
| 2019/0228153 A1* | 7/2019 | Scaife | G06F 21/566 |
| 2019/0303571 A1 | 10/2019 | Chelarescu et al. | |
| 2019/0303572 A1 | 10/2019 | Chelarescu et al. | |
| 2019/0303573 A1 | 10/2019 | Chelarescu et al. | |
| 2019/0303575 A1 | 10/2019 | Chelarescu et al. | |
| 2019/0347415 A1 | 11/2019 | Yavo et al. | |
| 2019/0347419 A1 | 11/2019 | Geng | |

OTHER PUBLICATIONS

"Data Backup and recovery", Retrieved from: https://www.pcrisk.com/how-to-remove-spyware/data-backup-and-recovery, Retrieved on: Feb. 5, 2018, 7 Pages.

"Eset vs. Crypto-ransomware", In White Paper of ESET, Retrieved on: Feb. 7, 2018, 9 Pages.

D-Souza-Wiltshire, et al., "Configure the notifications that appear on endpoints", Retrieved from: https://docs.microsoft.com/en-us/windows/threat-protection/windows-defender-antivirus/configure-notifications-windows-defender-antivirus, Oct. 31, 2017, 5 Pages.

"International Search Report and Written Opinion Issued in PCT Application No. PCT/US2019/023772", dated May 7, 2019, 12 Pages.

"International Search Report and Written Opinion Issued in PCT Application No. PCT/US2019/023776", dated May 14, 2019, 13 Pages.

"International Search Report and Written Opinion Issued in PCT Patent Application No. PCT/US19/023770", dated Jun. 25, 2019, 10 Pages.

"International Search Report and Written Opinion Issued in PCT Patent Application No. PCT/US19/023771", dated Jun. 25, 2019, 10 Pages.

"International Search Report and Written Opinion Issued in PCT Patent Application No. PCT/US19/023775", dated Jun. 25, 2019, 10 Pages.

"File Type Detection and Filtration Overview", Retrieved from: <<https://onlinehelp.opswat.com/corev3/2.4.4._File_Type_Detection_And_Filtration_Overview.html>>, Retrieved on: Feb. 5, 2018, 3 Pages.

"Nextcloud presents Ransomware Protection app", Retrieved from: <<https://help.nextcloud.com/t/nextcloud-presents-ransomware-protection-app/19255>>, Aug. 8, 2017, 6 Pages.

Hatem, et al., "Malware Detection in Cloud Computing", In Journal of International Journal of Advanced Computer Science and Applications, vol. 5, Issue 4, 2014, pp. 187-192.

Muthurajkumar, et al., "Agent Based Intelligent Approach for the Malware Detection for Infected Cloud Data Storage Files", In Proceedings of Seventh International Conference on Advanced Computing, Dec. 15, 2015, pp. 1-5.

"Non Final Office Action Issued in U.S. Appl. No. 15/942,009", dated Apr. 29, 2020, 22 Pages.

"Non Final Office Action Issued in U.S. Appl. No. 15/941,243", dated Feb. 6, 2020, 21 Pages.

"Non Final Office Action Issued in U.S. Appl. No. 15/941,840", dated Mar. 4, 2020, 14 Pages.

(56) References Cited

OTHER PUBLICATIONS

"Non Final Office Action Issued in U.S. Appl. No. 15/941,219", dated Jul. 28, 2020, 16 Pages.
"Final Office Action Issued in U.S. Appl. No. 15/941,840", dated Jul. 30, 2020, 17 Pages.
"Final Office Action issued in U.S. Appl. No. 15/942,009", dated Aug. 31, 2020, 23 Pages.
"Non Final Office Action issued in U.S. Appl. No. 15/941,840", dated Nov. 20, 2020, 15 Pages.
"Notice of Allowance issued in U.S. Appl. No. 15/942,009", dated Dec. 3, 2020, 14 Pages.

* cited by examiner

SERVICE IDENTIFICATION OF RANSOMWARE IMPACTED FILES

TECHNICAL FIELD

The subject matter disclosed herein generally relates to a special-purpose machine that detects ransomware impacted files stored in a cloud storage system and improves the detection of ransomware impacted files using feedback from users of the cloud storage system, including computerized variants of such special-purpose machines and improvements to such variants, and to the technologies by which such special-purpose machines become improved compared to other special-purpose machines that detect ransomware. Specifically, the present disclosure addresses systems and methods that detect a ransomware impacted file in a cloud storage system, requests a confirmation of the ransomware from a user at a client device, and updates a ransomware detection process at the cloud storage system.

BACKGROUND

Conventionally, a ransomware attack on a computer modifies some files stored on the computer by encrypting the content of the files and holding the encrypted files for ransom. A user of the computer may not have other recourse to recover the encrypted files besides paying the ransom. If the ransom is not paid within a specified time, the files are permanently lost.

BRIEF DESCRIPTION OF THE DRAWINGS

Some embodiments are illustrated by way of example and not limitation in the figures of the accompanying drawings.

DETAILED DESCRIPTION

Figure 1:
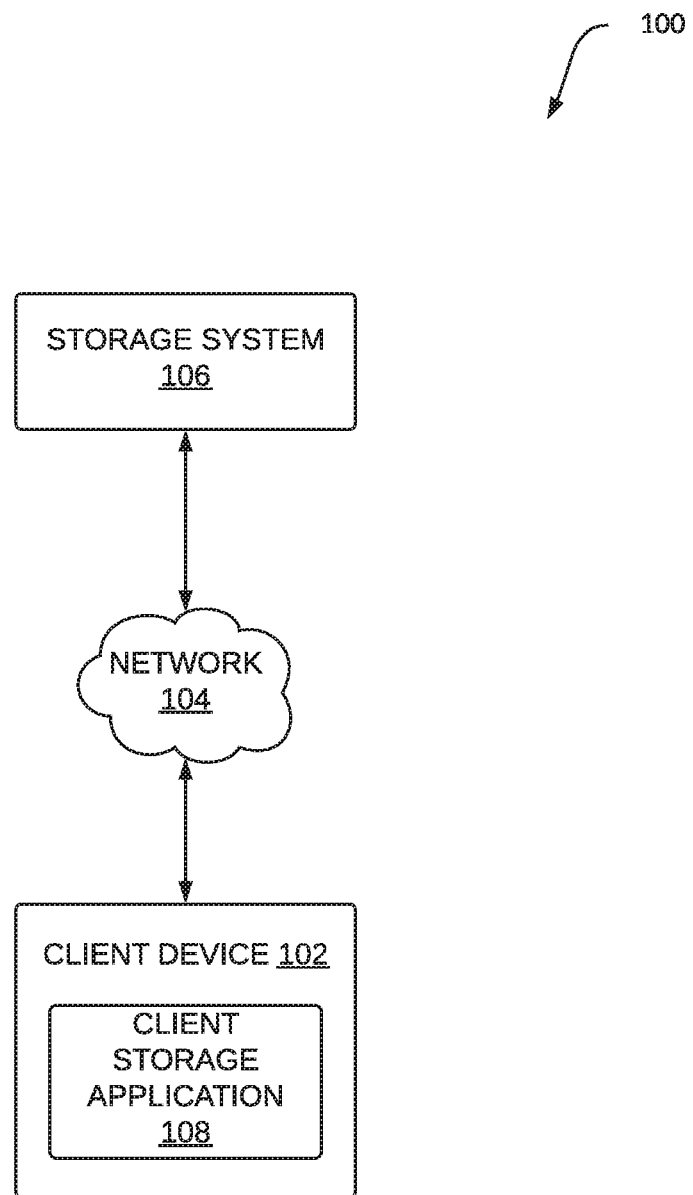
FIG. 1 is a block diagram illustrating an example environment for detecting ransomware impacted files in accordance with an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly started otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) detect and identify ransomware impacted files stored in a cloud storage system (also referred to as cloud storage server) and improve the detection of ransomware using feedback validation from users of the cloud storage system. The files stored in the cloud storage server are synced to a drive or folder at a corresponding client device registered with the cloud storage server. The cloud storage system performs a series of tests on individual files and heuristics for several files) in the cloud storage account of the client device. Examples of tests include detecting whether a previously un-encrypted file is now encrypted, detecting whether a file has been renamed with a file extension or naming pattern associated with ransomware, detecting whether content of the file matches a type of content identified by the file extension of the file, and using machine learning based on user feedback to determine whether the file is impacted by ransomware. Once the file has been confirmed to be impacted by ransomware, the cloud storage server presents an option to the client device to restore the impacted file to a previous (non-impacted) version of the file prior to the ransomware attack.

In accordance with example embodiments, a cloud storage server receives a request from a client device to store a new file or modify an existing file stored at the cloud storage server. The server-stored file may be a copy of a client-stored file stored at the client device. The cloud storage server modifies the server-stored file. The features of the server-stored file are determined. The cloud storage server detects ransomware activity based on the features of the server-stored file and generates a notification to the client device. The notification indicates a presence of ransomware activity in the server-stored file (and in the corresponding client-stored file). The notification also includes a request for a user of the client device to confirm the presence of the ransomware activity in the server-stored file (and optionally in the corresponding client-stored file). The cloud storage server receives the ransomware confirmation from the client device and updates an operation of how the cloud storage server detects the ransomware activity based on the received ransomware confirmation.

As a result, one or more of the methodologies described herein facilitate solving the technical problem of identifying which file stored either in a client device and in a cloud storage server is affected by ransomware and verifying the presence of the ransomware impact in the file. As such, one or more of the methodologies described herein may obviate a need for certain efforts or computing resources that otherwise would be involved in generating false positives of ransomware detection in the files. As a result, resources used by one or more machines, databases, or devices (e.g., within the cloud storage system environment) may be reduced. Examples of such computing resources include processor cycles, network traffic, memory usage, data storage capacity, power consumption, network bandwidth, and cooling capacity.

FIG. 1 is a block diagram illustrating an example environment 100 for detecting ransomware impacted files in accordance with an example embodiment. In example embodiments, a storage system 106 stores copies of files from a client device 102. The storage system 106 will be discussed in more detail in connection with FIG. 2 below.

The storage system 106 is coupled, via a network 104, to one or more client devices (e.g., the client device 102). One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The client device 102 includes a client storage application 108 configured to communicate files (e.g., send and receive versions of files) or modifications in the files with the storage system 106. For example, the client storage application 108 syncs local files stored in a preset directory or folder at the client device 102 with files stored in a corresponding directory or folder at the storage system 106. Therefore, changes made to a local file in the preset folder of the client device 102 are propagated to a corresponding remote file (a copy of the local file) at the storage system 106. In one example, the client storage application 108 registers the client device 102 with the storage system 106 and communicates copies of the user-selected local files at the client device 102 to the storage system 106. In another example, changes made to a remote file at the storage system 106 are propagated to a corresponding local file at the client device 102.

In one example embodiment, the storage system 106 detects whether a modified file stored at the storage system 106 is impacted (also referred to as "infected") by ransomware (or malware). The storage system 106 generates a notification to the client storage application 108 of the detected ransomware and seeks a confirmation or validation from the client device 102. The storage system 106 uses the feedback (e.g., validation/confirmation) to provide additional reference data to a learning engine to increase its accuracy of detecting future ransomware activity at the storage system 106 and avoiding false positives.

The client device 102 comprises, but is not limited to, a smartphone, tablet, laptop, multi-processor system, microprocessor-based or programmable consumer electronics system, game console, set-top box, or any other device that a user utilizes to communicate over the network 104. In example embodiments, the client device 102 comprises a display module (not shown) to display information (e.g., in the form of specially configured user interfaces, or in the form of a web browser). In some embodiments, the client device 102 may comprise one or more of a touch screen, camera, keyboard, microphone, and Global Positioning System (GPS) device.

Any of the systems or machines (e.g., databases, devices, or servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client devices 102 may be embodied within the environment 100. Furthermore, some components or functions of the environment 100 may be combined or located elsewhere in the environment 100. For example, some of the functions of the client storage application 108 may be embodied at the storage system 106.

Figure 2:
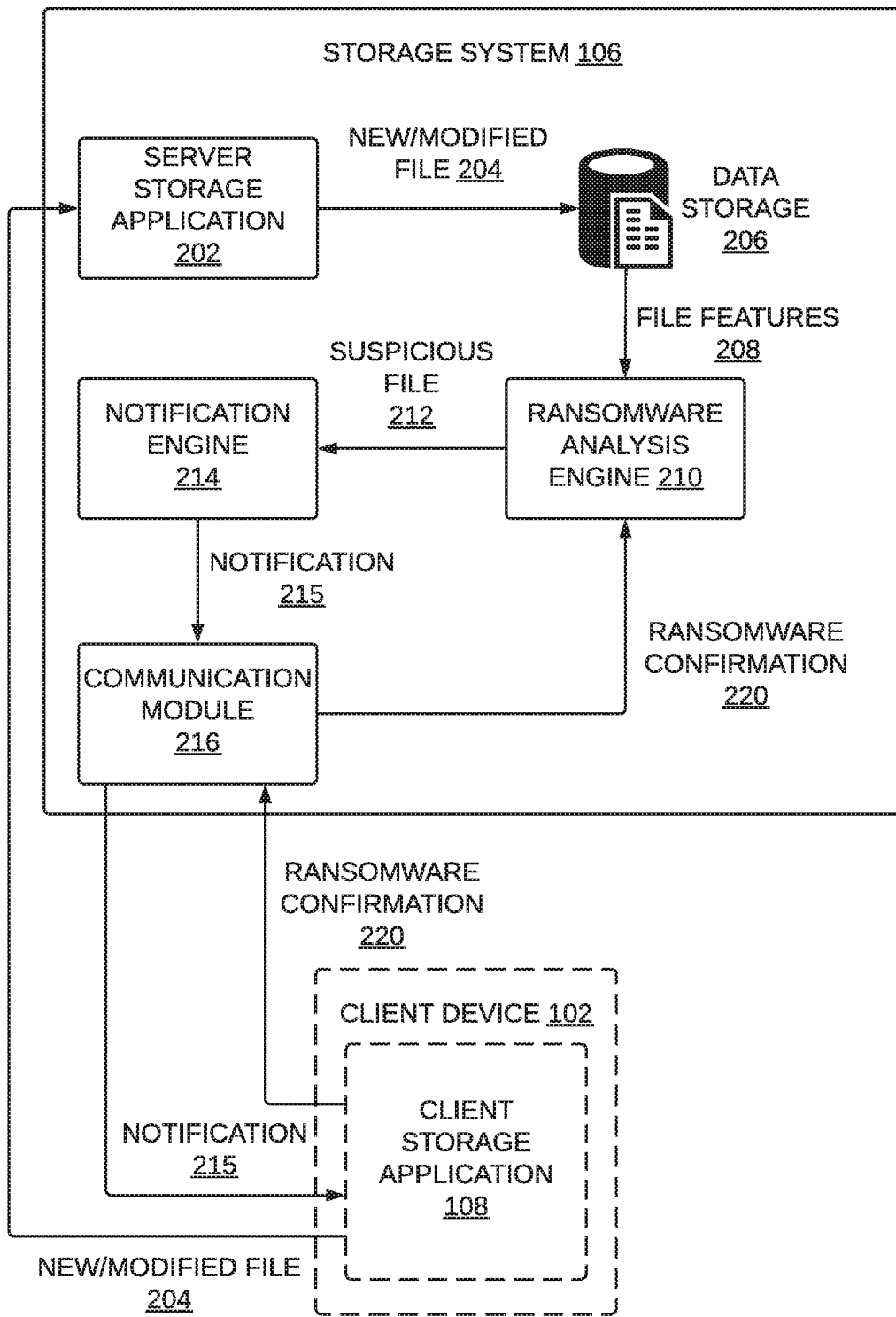
FIG. 2 is a block diagram illustrating components within a storage system in accordance with an example embodiment.

FIG. 2 is a block diagram illustrating components within a storage system 106 in accordance with an example embodiment. In example embodiments, the storage system 106 performs operations to detect and identify ransomware impacted files stored in the storage system 106 and improve the detection of ransomware using feedback validation from users of the storage system 106. To enable these operations, the storage system 106 comprises a server storage application 202, a data storage 206, a ransomware analysis engine 210, a notification engine 214, and a communication module 216, all of which are configured to communicate with each other (e.g., over a bus, shared memory, or a switch) in accordance with an example embodiment.

The server storage application 202 is configured to interface and communicate with the client storage application 108. The server storage application 202 receives a copy of a new or modified file 204 from the client storage application 108. The server storage application 202 may also receive a request from the client storage application 108 to add the new file in the data storage 206 or to replace an existing corresponding file with the modified file in the data storage 206.

In other example embodiments, the server storage application 202 receives and sends copies of files between the storage system 106 and the client device 102. In one example, the server storage application 202 is configured with the client storage application 108 to store one or more versions of copies of files received from the client storage application 108. For example, the server storage application 202 registers the client storage application 108 and forms a folder or a directory (that corresponds to a user-selected folder or directory at the client device 102) at the storage system 106. Therefore, any changes to a file in the folder at the client device 102 are replicated to the corresponding file in the corresponding folder at the storage system 106. In another example embodiment, the server storage application 202 identifies historical changes to a file stored at the storage system 106 based on the different versions of the file received from the client storage application 108. The server storage application 202 stores file changes (e.g., the new or modified file 204) in the data storage 206.

The data storage 206 is configured to store the files (e.g., the new or modified file 204) received from the server storage application 202. The files may be copies of files stored at the client device 102. In one example, the data storage 206 is configured to store several versions of the files based on the date and time of the different versions of the files. The files may include attributes such as file name, file extension, and size. Those of ordinary skill in the art will recognize that the files can include other different types of attributes.

In example embodiments, the data storage 206 is configured to store files and user information for individual users in user-specific data stores or databases (hereinafter collectively referred to as a. "user data structure"). For instance, each user data structure may correspond to a folder and/or a directory of the client device 102 of a user. While the data storage 206 is shown to be a part of the storage system 106, in some embodiments, the data storage 206 may be located elsewhere in the environment 100 and be communicatively coupled to the storage system 106. Additionally, any number of data storages 206 may be used to store the user data structures.

In example embodiments, the data storage 206 provides file features 208 of the new or modified file 204 (received from the server storage application 202) to the ransomware analysis engine 210. In another example embodiment, the data storage 206 provides stored copies of the new or modified file 204 to the ransomware analysis engine 210.

The ransomware analysis engine 210 performs a series of tests on the new or modified file 204 (or the file features 208 of the new or modified file 204) to detect whether the new or modified file 204 is impacted by ransomware. The ransomware analysis engine 210 will be discussed in more detail in connection with FIG. 3 below. Once the ransomware analysis engine 210 determines that the new or modified file 204 is impacted by ransomware, the ransomware analysis engine 210 provides an identification of the suspicious file 212 (e.g., the new or modified file 204) to the notification engine 214.

The notification engine 214 generates a notification 215 that requests a user of the client storage application 108 to confirm and validate whether the suspicious file 212 is impacted by ransomware. The notification 215 includes, for example, an identification of the suspicious file 212, a time of the suspected infection, a version of the suspicious file 212, an identification of who last modified the suspicious file 212, an identification of the name of the suspected ransomware (or malware), and an identification of suspicious changes in the name or content of the suspicious file 212. The notification engine 214 provides the notification 215 to the communication module 216.

The communication module 216 is configured to exchange communications with the client device 102. For example, the communication module 216 transmits the notification 215 to the client storage application 108. The communication module 216 receives a ransomware confirmation 220 from the client storage application 108 in response to sending out the notification 215. The ransomware confirmation 220 indicates a user (of the client device 102) confirmation of whether the suspicious file 212 is indeed impacted by ransomware. The communication module 216 forwards the user feedback (e.g., the ransomware confirmation 220) to the ransomware analysis engine 210.

In other example embodiments, the communication module 216 includes a user interface module (not shown) that is configured to cause presentation of specially configured user interfaces on the client device 102 that include a visual indication of the ransomware-impacted file and other pertinent information (e.g., time of infection, last modified author, size change). The user interface module generates and transmits instructions to the client device 102 to render and display the user interfaces.

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that component. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The storage system 106 may comprise other components not pertinent to example embodiments that are not shown or discussed. Further still, one or more of the components of the storage system 106 may be located at one or more of the client devices.

Figure 3:
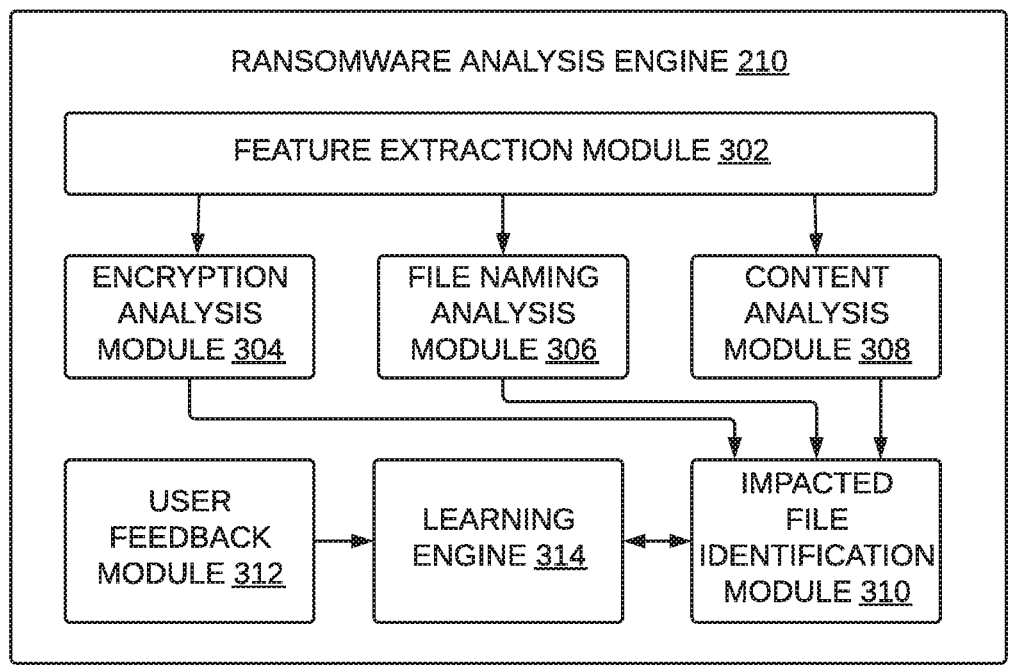
FIG. 3 is a block diagram illustrating components within a ransomware analysis engine in accordance with an example embodiment.

FIG. 3 is a block diagram illustrating components within a ransomware analysis engine 210 in accordance with an example embodiment. The ransomware analysis engine 210 performs operations to detect and identify ransomware impacted files stored in the data storage 206 and to improve the detection of ransomware using feedback validation from users of the data storage 206. To enable these operations, the ransomware analysis engine 210 comprises a feature extraction module 302, an encryption analysis module 304, a file naming analysis module 306, a content analysis module 308, a user feedback module 312, a learning engine 314, and an impacted file identification module 310, all of which are configured to communicate with each other e.g., over a bus, shared memory, or a switch) in accordance with an example embodiment.

The feature extraction module 302 extracts features from a file stored at the data storage 206. In one example, the feature extraction module 302 extracts features from a last modified file or a new file received from the client storage application 108 via the server storage application 202. Examples of features (also referred to as "attributes" or "properties" in the present document) include, but are not limited to, attributes of the files such as file encryption status, file extension, date of creation, date of modification, versioning number, author name, type of media, and compression status.

The encryption analysis module 304 determines the encryption status of the new or modified file based on the extracted features of the file. For example, the encryption analysis module 304 determines that the encryption status of the modified file has changed (e.g., from unencrypted to encrypted: a modified file is now encrypted whereas a previous version of the corresponding file is unencrypted). In another example, the encryption analysis module 304 determines that the new file is encrypted. The encryption analysis module 304 provides the encryption status of the new or modified file to the impacted file identification module 310.

The file naming analysis module 306 determines a name of the new or modified file and the file extension of the new or modified file based on the extracted features of the new or modified file. For example, the file naming analysis module 306 compares the name of the new or modified file with known ransomware file names. In other example embodiments, the file naming analysis module 306 determines whether there is an increase in file renames in the folder of the data storage 206 corresponding to the folder in the client device 102. In other example embodiments, the file naming analysis module 306 monitors for text strings associated with known ransomware. The file naming analysis module 306 provides the ransomware file name matching results of the new or modified file to the impacted file identification module 310.

The content analysis module 308 determines whether a file's content does not match its file type (based on its file extension, header content, or mime type). For example, the content analysis module 308 determines that the content in a .jpg file is not an image. The content analysis module 308 provides the content analysis result of the new or modified file to the impacted file identification module 310.

The user feedback module 312 is configured to receive feedback (e.g., confirmation and validation of the presence of ransomware in a new or modified file) from the client storage application 108 of the client device 102. For example, the user feedback module 312 receives a ransomware confirmation from the client storage application 108 based on user feedback at the client storage application 108. The user feedback indicates whether the new or modified file is indeed impacted by ransomware. The user feedback module 312 provides the user feedback (e.g., the ransomware confirmation 220) to the learning engine 314.

The learning engine 314 (e.g., a machine learning algorithm) manages a learning model for identifying ransomware files. The learning engine 314 accesses file information (associated with the client device 102) from the data storage 206. The file information includes attributes, extensions, and features (including user feedback) of old, new, and modified files associated with the client device 102. Using the file information, the learning engine 314 can identify trends or patterns. For example, the learning engine 314 learns, based on file extensions, that the new file is actually not related to ransomware, as confirmed by the user of the client device 102, because the user has given the file a name associated with known ransomware. In another example, the learning engine 314 learns that a file that is encrypted and has a file extension with a particular naming pattern (e.g., previously associated with existing ransomware) is likely affected by ransomware.

Based on the learning model, the learning engine 314 can, in one embodiment, suggest to the impacted file identification module 310 that the new or modified file is likely or is not likely affected by ransomware. In a further embodiment, the learning engine 314 updates a list of files that have been confirmed or validated as safe (non-impacted by ransomware) from the client device 102. All of the trends or patterns identified by the learning engine 314 may be stored in the data storage 206 and provided to the impacted file identification module 310 for further processing.

In other example embodiments, the learning engine 314 determines the number of files (e.g., in the account of the client device 102 in the data storage 206) being updated, deleted, created, encrypted, and with suspicious extensions, and generates a determination or confidence level that one of the files (or the user account) is impacted by a malware or ransomware attack.

The impacted file identification module 310 receives the results from the encryption analysis module 304, the file naming analysis module 306, the content analysis module 308, and the learning engine 314 to assess and determine whether the new or modified file is likely impacted by ransomware. In example embodiments, the impacted file identification module 310 provides a range of confidence that the new or modified file is impacted by ransomware. For example, the impacted file identification module 310 determines that a modified file is likely impacted by ransomware based on a determination that the modified file is now encrypted (and an immediately previous version of the modified file was unencrypted) and that the file extension of the file matches portions of text strings associated with known ransomware, and based on previous user feedback (e.g., from the client device 102 or from other users or client devices with files sharing the same attributes or features).

Figure 4:
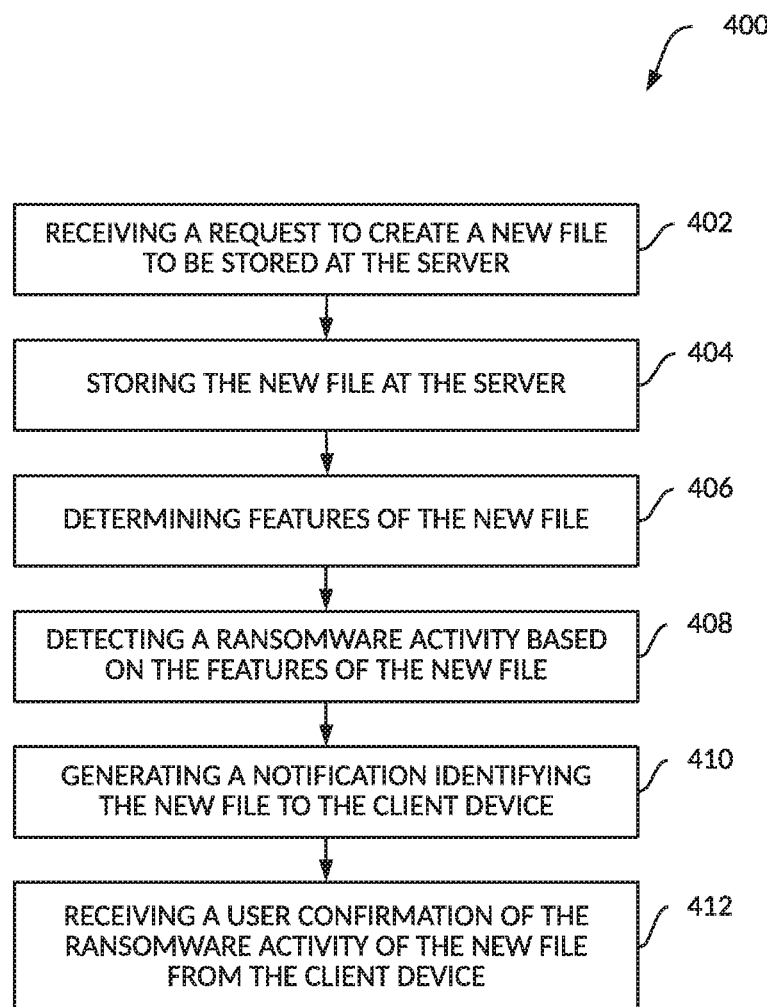
FIG. 4 is a flow diagram of a method for detecting ransomware activity in accordance with an example embodiment.

FIG. 4 is a flow diagram of a method 400 for detecting ransomware activity in accordance with an example embodiment. Operations in the method 400 may be performed by the storage system 106, using components (e.g., modules, engines) described above with respect to FIG. 2. Accordingly, the method 400 is described by way of example with reference to the storage system 106. However, it shall be appreciated that at least some of the operations of the method 400 may be deployed on various other hardware configurations or be performed by similar components residing elsewhere. For example, some of the operations may be performed at the client device 102.

In operation 402, the storage system 106 receives, from the client device 102, a request to create a new file to be stored at the storage system 106. In example embodiments, the storage system 106 stores copies of files from the client device 102 and receives a request to store the new file at the storage system 106. The storage system 106 receives the request via the server storage application 202.

In response to the request, in operation 404, the server storage application 202 accesses a user data structure (e.g., files, folder, directory) for the user from the data storage 206. The data storage 206 stores the new file in the user data structure (associated or registered with the client device 102). The user data structure includes copies of files corresponding to a folder or directory of the client device 102 indicated by the client storage application 108.

In operation 406, the ransomware analysis engine 210 determines features of the new file received at operation 402. Examples of features include an encryption status, a file or extension naming pattern, a content analysis matching result, and user feedback related to files similar to the new file.

In operation 408, the ransomware analysis engine 210 detects ransomware (and other types of malware) activity based on the features of the new file.

In operation 410, the notification engine 214 generates a notification that identifies the new file (based on the file identification from the ransomware analysis engine 210) as affected by ransomware activity to the client device 102. The communication module 216 sends the notification to the client device 102.

In operation 412, the ransomware analysis engine 210 receives a user confirmation of the ransomware activity of the new file from the client device 102 via the communication module 216.

Figure 5:
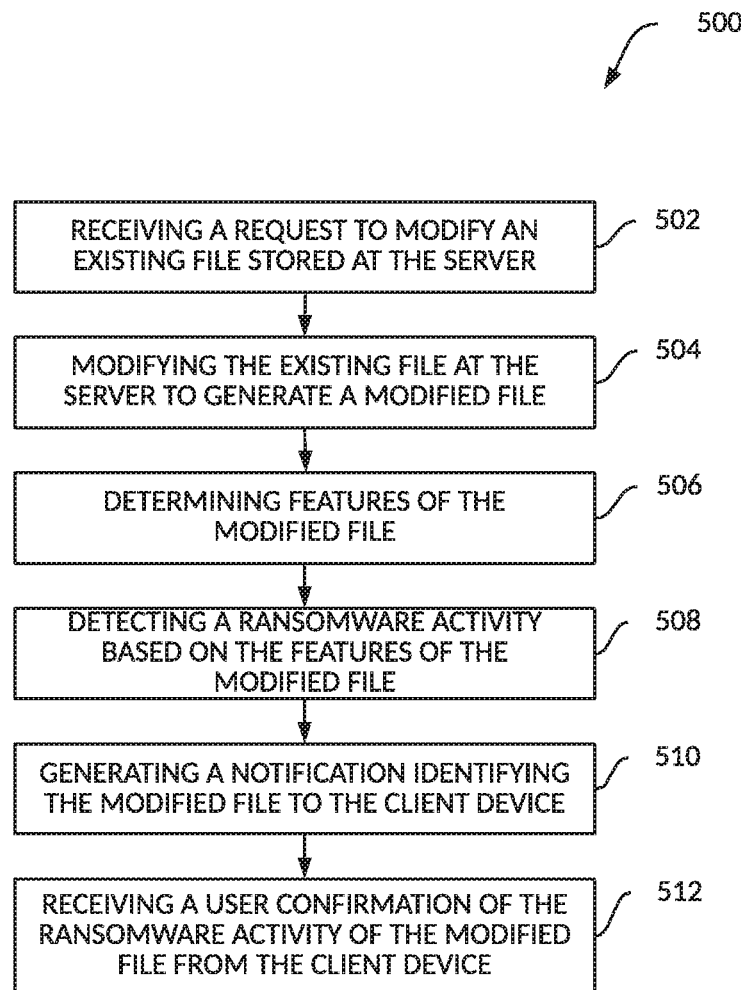
FIG. 5 is a flow diagram of a method for detecting ransomware activity in accordance with another example embodiment.

FIG. 5 is a flow diagram of a method 500 for detecting ransomware activity in accordance with another example embodiment. Operations in the method 500 may be performed by the storage system 106, using components (e.g., modules, engines) described above with respect to FIG. 2. Accordingly, the method 500 is described by way of example with reference to the storage system 106. However, it shall be appreciated that at least some of the operations of the method 500 may be deployed on various other hardware configurations or be performed by similar components residing elsewhere. For example, some of the operations may be performed at the client device 102.

In operation 502, the storage system 106 receives, from the client device 102, a request to modify or replace an existing file stored at the storage system 106 with a modified file. In example embodiments, the storage system 106 stores copies of files from the client device 102 and receives a request to store the modified file at the storage system 106. The storage system 106 receives the request via the server storage application 202.

In response to the request, in operation 504, the server storage application 202 accesses a user data structure (e.g., files, folder, directory) for the user from the data storage 206. The data storage 206 stores the modified file in the user data structure (associated or registered with the client device 102). The user data structure includes copies of files corresponding to a folder or directory of the client device 102 indicated by the client storage application 108.

In operation 506, the ransomware analysis engine 210 determines features of the modified file received at operation 502. Examples of features include an encryption status, a file or extension naming pattern, a content analysis matching result, and user feedback related to files similar to the modified file.

In operation 508, the ransomware analysis engine 210 detects ransomware activity (e.g., ransomware) based on the features of the modified file.

In operation 510, the notification engine 214 generates a notification that identifies the modified file (based on the file identification from the ransomware analysis engine 210) as affected by ransomware to the client device 102. The communication module 216 sends the notification to the client device 102.

In operation 512, the ransomware analysis engine 210 receives a user confirmation of the ransomware activity of the modified file from the client device 102 via the communication module 216.

Figure 6:
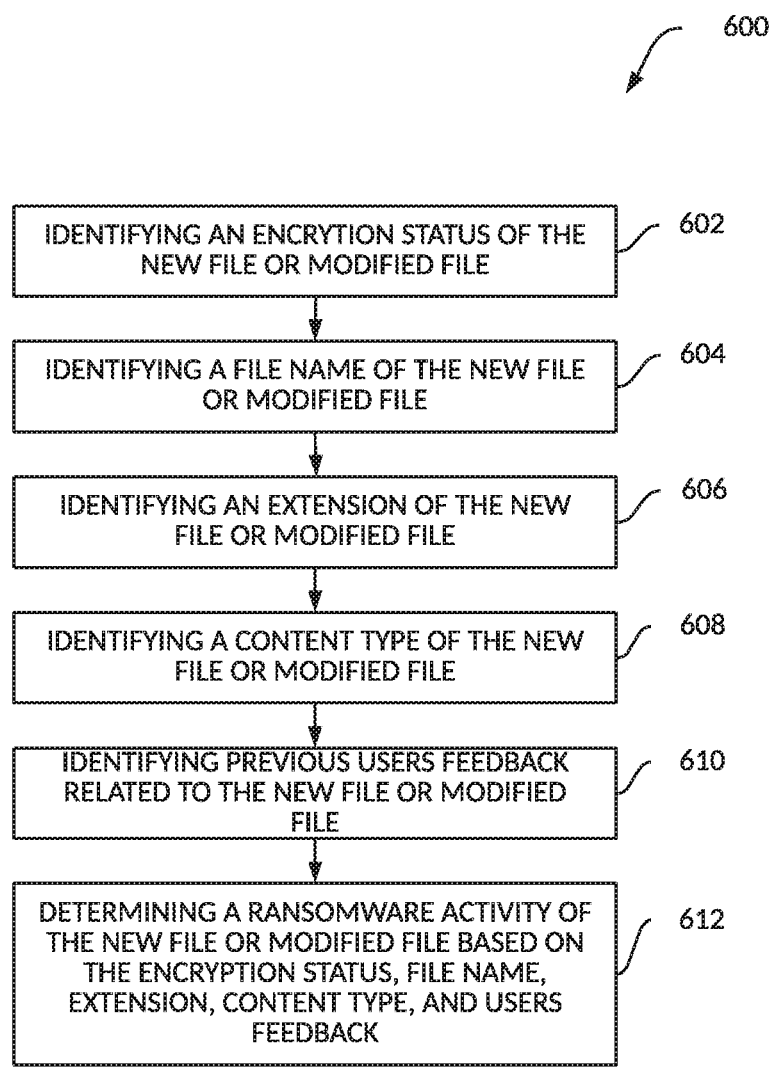
FIG. 6 is a flow diagram of a method for determining ransomware activity in a storage system in accordance with an example embodiment.

FIG. 6 is a flow diagram of a method 600 for determining ransomware activity in a storage system in accordance with an example embodiment. Operations in the method 600 may be performed by the storage system 106, using components (e.g., modules, engines) described above with respect to FIG. 2. Accordingly, the method 600 is described by way of example with reference to the ransomware analysis engine 210. However, it shall be appreciated that at least some of the operations of the method 600 may be deployed on various other hardware configurations or be performed by similar components residing elsewhere. For example, some of the operations may be performed at the client device 102.

In operation 602, the encryption analysis module 304 identifies an encryption status of a new or modified file. For example, the encryption analysis module 304 determines whether the new or modified file is encrypted (and if so, whether the immediately previous version of the file stored at the data storage 206 is unencrypted).

In operation 604, the file naming analysis module 306 identifies a file name of the new or modified file.

In operation 606, the file naming analysis module 306 identifies a file extension of the new or modified file.

In operation 608, the content analysis module 308 identifies a content type of the new or modified file. For example, the content analysis module 308 determines that the content of the new or modified file does not match with the file extension (or header or mime type) of the new or modified file.

In operation 610, the user feedback module 312 identifies previous user feedback (or other users' feedback) related to the new or modified file (or similar files based on the aforementioned features).

In operation 612, the impacted file identification module 310 determines ransomware activity of the new or modified file based on the encryption status, the file name, the extension, the content type, and the previous user feedback.

Figure 7:
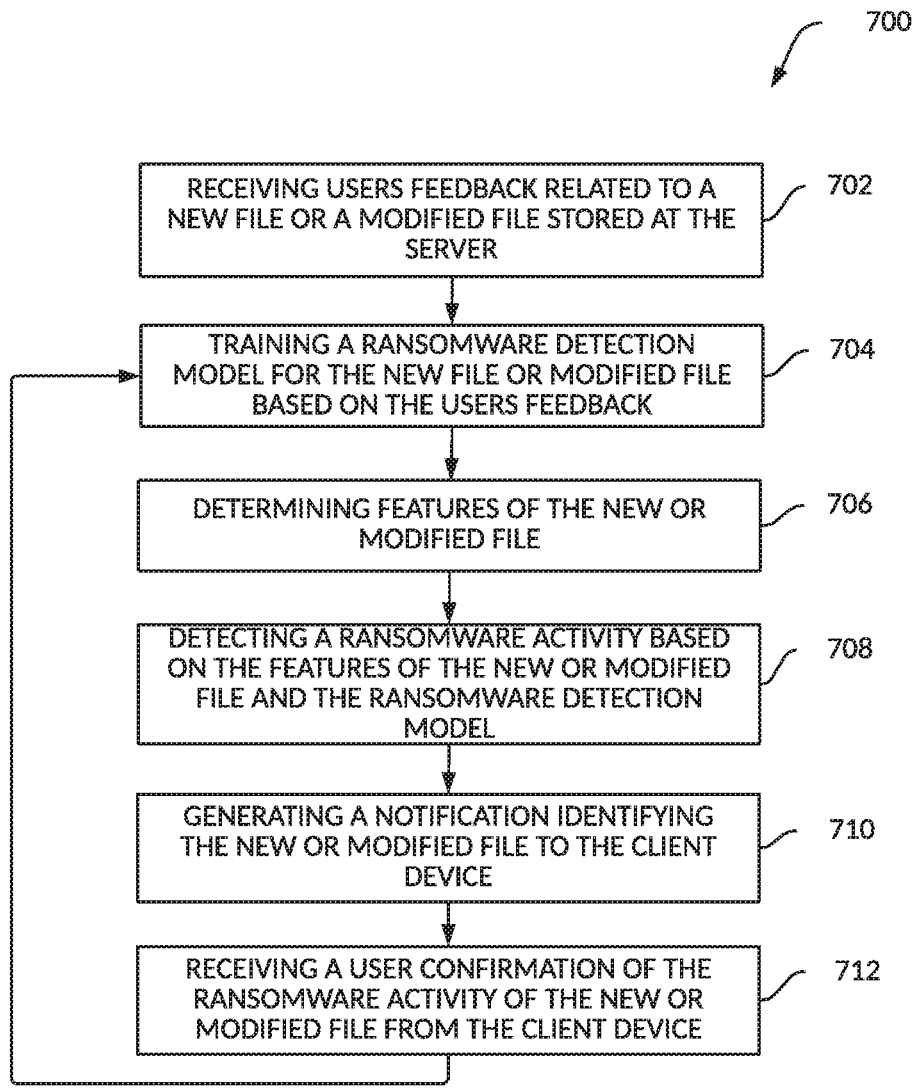
FIG. 7 is a flow diagram of a method for determining ransomware activity in a storage system in accordance with another example embodiment.

FIG. 7 is a flow diagram of a method 700 for determining ransomware activity in a storage system in accordance with another example embodiment. Operations in the method 700 may be performed by the storage system 106, using components (e.g., modules, engines) described above with respect to FIG. 2. Accordingly, the method 700 is described by way of example with reference to the ransomware analysis engine 210. However, it shall be appreciated that at least some of the operations of the method 700 may be deployed on various other hardware configurations or be performed by similar components residing elsewhere. For example, some of the operations may be performed at the client device 102.

In operation 702, the user feedback module 312 receives previous user feedback (or other users' feedback) related to a new or modified file stored at the storage system 106.

In operation 704, the learning engine 314 trains a ransomware detection model for the new or modified file based on the user feedback.

In operation 706, the feature extraction module 302 determines features of the new or modified file. Examples of features include an encryption status, a file or extension naming pattern, a content analysis matching result, and user feedback related to files similar to the new or modified file.

In operation 708, the impacted file identification module 310 detects ransomware activity (e.g., ransomware) based on the features of the new or modified file as previously determined in operation 706 and based on the ransomware detection model as previously determined in operation 704.

In operation 710, the notification engine 214 generates a notification that identifies the new or modified file (based on the file identification from operation 708) as potentially affected by ransomware to the client device 102. The communication module 216 sends the notification to the client device 102.

In operation 712, the ransomware analysis engine 210 receives a user confirmation of the ransomware activity of the new or modified file from the client device 102 via the communication module 216.

Figure 8:
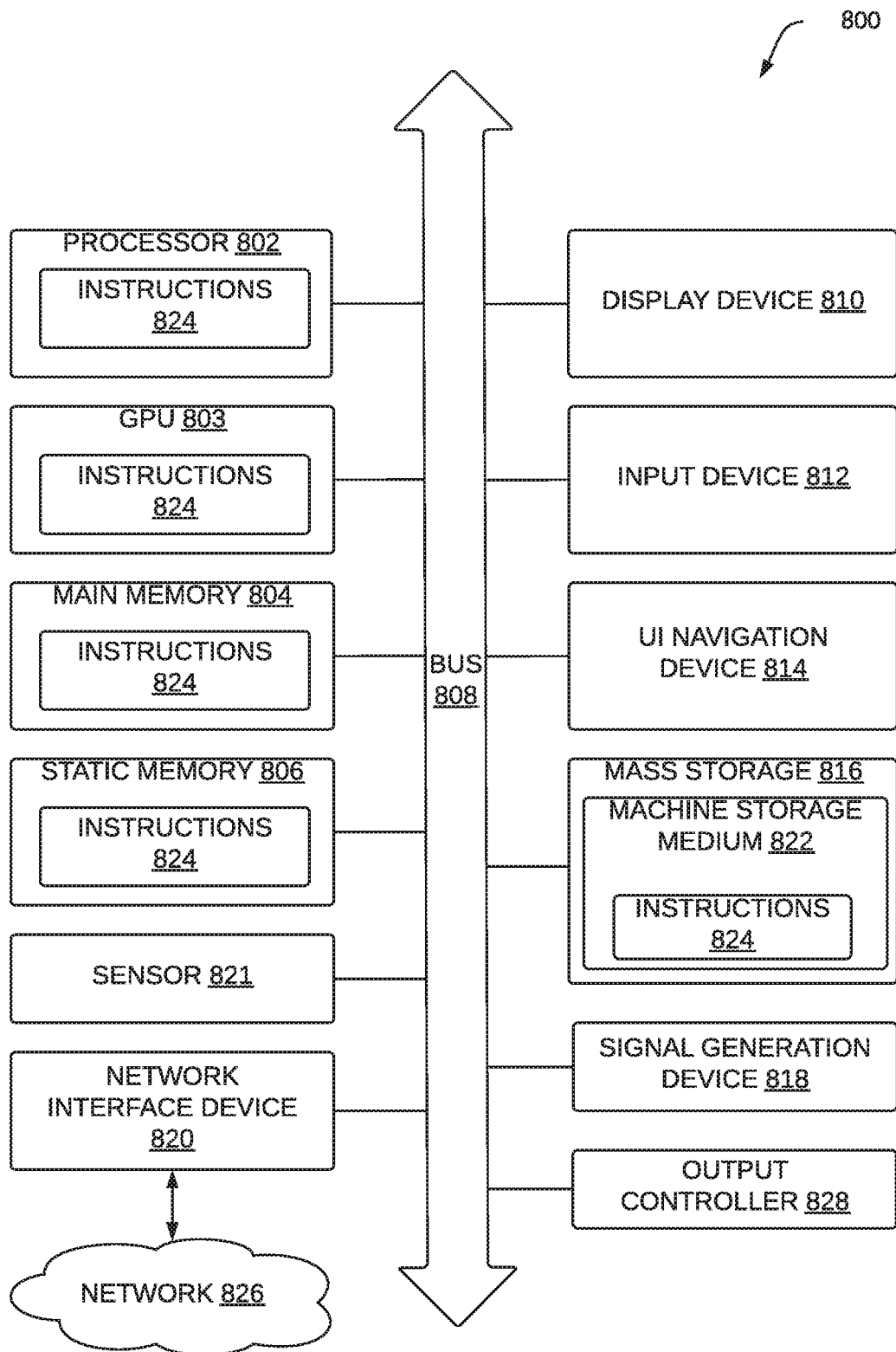
FIG. 8 is a diagrammatic representation of a machine in an example form of a computing system within which a set of instructions may be executed for causing the machine to perform any one or more of the methodologies discussed herein, according to an example embodiment.

FIG. 8 is a block diagram illustrating components of a machine 800, according to some example embodiments, able to read instructions 824 from a machine-storage medium 822 and perform any one or more of the methodologies discussed herein, in whole or in part. Specifically, FIG. 8 shows the machine 800 in the example form of a computer device (e.g., a computer) within which the instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flows and flow diagrams of FIGS. 4,5, 6, and 7. The instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 800 capable of executing the instructions 824, sequentially or otherwise, that specify actions to be taken by that machine 800. Further, while only a single machine 800 is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU) 803, a digital signal processor (DSP), an application specific integrated circuit (ASIC), a radio-frequency integrated circuit (RTIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a display device 810 (e.g., a plasma display panel (PDP), a light-emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a user interface (UI) navigation device 814 (e.g., a mouse, a touchpad, a trackball, a joystick, a motion sensor, an eye tracking device, or another pointing instrument), a storage unit 816, a signal generation device 818 (e.g., a sound card, an amplifier, a speaker, a headphone jack, or any suitable combination thereof), a network interface device 820, and one or more sensors 821, such as a Global Positioning System (GPS) sensor, compass, accelerometer, or another sensor. The machine 600 may include an output controller 828, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage unit 816 includes the machine-storage medium 822 on which are stored the instructions 824 embodying any one or more of the methodologies or functions described herein. The instructions 824 may also reside, completely or at least partially, within the processor 802, the GP 803, main memory 804, the static memory 806, or the machine storage medium 822 before or during execution thereof by the machine 800. Accordingly, the main memory 804 and the processor 802 may be considered machine-storage media 822 (e.g., tangible and non-transitory machine-readable media).

In some example embodiments, the machine 800 may be a portable computing device and have one or more additional input components (e.g., sensors or gauges) Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), art altitude detection component (e.g., an altimeter), and a gas detection component (e.g., a gas sensor) Inputs harvested by any one or more of these input components may be accessible and available for use by any of the modules described herein.

Executable Instructions and Machine-Storage Medium

The various memories (i.e., 804, 806, and/or the memory of the processor(s) 802) and/or the storage unit 816 may store one or more sets of instructions 824 and data structures (e.g., software) embodying or utilized by any one or more of the methodologies or functions described herein. These instructions, when executed by the processor(s) 802, cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communication network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" or "signal medium" shall be taken to include any intangible medium that is capable of storing, encoding, or carrying the instructions 824 for execution by the machine 800, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 822 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a system for detecting ransomware in a storage of a server. The system includes one or more hardware processors; and a memory storing instructions that, when executed by the one or more hardware processors, cause the one or more hardware processors to perform operations comprising: receiving, at a cloud storage server, a request from a client device to store a file at the cloud storage server; storing the file in a storage device of the cloud storage server; determining features of the server-stored file; detecting ransomware activity based on the features of the server-stored file; generating a notification to the client device in response to detecting the ransomware activity, the notification indicating a presence of the ransomware activity in the server-stored file, the notification including a request to confirm the presence of the ransomware activity in the server-stored file; receiving, from the client device, a ransomware confirmation in response to the notification, the ransomware confirmation indicating a confirmation of the presence or an absence of the ransomware activity in the server-stored file; and updating an operation of the detection of the ransomware activity based on the received ransomware confirmation.

In example 2, the subject matter of example 1 can optionally include wherein the file includes a new file to be added to a data structure in the cloud storage server, the data structure associated with the client device registered with the cloud storage server.

In example 3, the subject matter of example 1 can optionally include wherein the file includes a modified file of an original server-stored file in a data structure in the cloud storage server, the data structure associated with the client device registered with the cloud storage server, wherein storing the file includes modifying the original server-stored file to generate a modified server-stored file.

In example 4, the subject matter of example 3 can optionally include wherein the modified server-stored file is a copy of a client-stored file stored at the client device.

In example 5, the subject matter of example 1 can optionally include wherein determining the features of the server-stored file comprises: identifying an encryption status of the server-stored file; identifying a file extension of the server-stored file; identifying a content type of the server-stored file; and identifying previous user feedback related to the server-stored file.

In example 6, the subject matter of example 5 can optionally include wherein detecting the ransomware activity comprises: determining that the encryption status indicates that the server-stored file is encrypted and that a previous version of the server-stored file is unencrypted.

In example 7, the subject matter of example 5 can optionally include wherein detecting the ransomware activity comprises: determining that the file extension or a file name of the server-stored file is indicative of the ransomware activity; determining that the content type of the server-stored file does not correspond with content associated with the file extension of the server-stored file; and determining the previous user feedback in response to previous ransomware notifications related to the server-stored file.

In example 8, the subject matter of example 5 can optionally include wherein updating the operation of the detection of the ransomware activity further comprises: identifying at least one of a file name or the file extension as safe from the ransomware activity in response to the ransomware confirmation indicating the absence of the ransomware activity in the server-stored file.

In example 9, the subject matter of example 5 can optionally include wherein updating the operation of the detection of the ransomware activity further comprises: identifying at least one of a file name or the file extension as safe from the ransomware activity in response to the ransomware confirmation indicating the absence of the ransomware activity in a client-stored file copy of the server-stored file.

In example 10, the subject matter of example 1 can optionally include wherein the notification further indicates a time of the ransomware activity and a plurality of options to remedy the ransomware activity.

Although an overview of the present subject matter has been described with reference to specific example embodiments, various modifications and changes may be made to these embodiments without departing from the broader scope of embodiments of the present disclosure. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense,

What is claimed is:

1. A computer-implemented method comprising:
    receiving, at a cloud storage server, a request from a client device to replace a file stored at the cloud storage server with a modified version of the file provided by the client device;
    replacing the file in a storage device of the cloud storage server with the modified version of the file in response to receiving the request;
    determining features of the modified version of the file at the storage device of the cloud storage server;
    detecting ransomware activity based on the features of the modified version of the file after replacing the file with the modified version of the file at the cloud storage server;
    generating a notification to the client device in response to detecting the ransomware activity, the notification indicating a presence of the ransomware activity in the modified version of the file, the notification including a request to confirm the presence of the ransomware activity in the modified version of the file;
    receiving, from the client device, a ransomware confirmation in response to the notification, the ransomware confirmation indicating a confirmation of the presence or an absence of the ransomware activity in the modified version of the file; and
    updating an operation of the detection of the ransomware activity based on the received ransomware confirmation.

2. The computer-implemented method of claim 1, wherein the modified version of the file is stored in a data structure in the cloud storage server, the data structure associated with the client device registered with the cloud storage server.

3. The computer-implemented method of claim 1, wherein the modified version of the file is a copy of a client-stored file stored at the client device.

4. The computer-implemented method of claim 1, wherein determining the features of the modified version of the file comprises:
    identifying an encryption status of the modified version of the file;
    identifying a file extension of the modified version of the file;
    identifying a content type of the modified version of the file; and
    identifying previous user feedback related to the modified version of the file.

5. The computer-implemented method of claim 4, wherein detecting the ransomware activity comprises:
    determining that the encryption status indicates that the modified version of the file is encrypted and that a previous version of the modified version of the file is unencrypted.

6. The computer-implemented method of claim 4, wherein detecting the ransomware activity comprises:
    determining that the file extension or a file name of the modified version of the file is indicative of the ransomware activity;
    determining that the content type of the modified version of the file does not correspond with content associated with the file extension of the modified version of the file; and
    determining the previous user feedback in response to previous ransomware notifications related to the modified version of the file.

7. The computer-implemented method of claim 6, wherein updating the operation of the detection of the ransomware activity further comprises:
    identifying at least one of a file name or the file extension as safe from the ransomware activity in response to the ransomware confirmation indicating the absence of the ransomware activity in the modified version of the file.

8. The computer-implemented method of claim 6, wherein updating the operation of the detection of the ransomware activity further comprises:
    identifying at least one of a file name or the file extension as safe from the ransomware activity in response to the ransomware confirmation indicating an absence of the ransomware activity in a client-stored file copy of the modified version of the file.

9. The computer-implemented method of claim 1, wherein the notification further indicates a time of the ransomware activity and a plurality of options to remedy the ransomware activity.

10. A system comprising:
    one or more hardware processors; and
    a memory storing instructions that, when executed by the one or more hardware processors, cause the one or more hardware processors to perform operations comprising:
        receiving, at a cloud storage server, a request from a client device to replace a file stored at the cloud storage server with a modified version of the file provided by the client device;
        replacing the file in a storage device of the cloud storage server with the modified version of the file in response to receiving the request;
        determining features of the modified version of the file at the storage device of the cloud storage server;
        detecting ransomware activity based on the features of the modified version of the file after replacing the file with the modified version of the file at the cloud storage server;
        generating a notification to the client device in response to detecting the ransomware activity, the notification indicating a presence of the ransomware activity in the modified version of the file, the notification including a request to confirm the presence of the ransomware activity in the modified version of the file;
        receiving, from the client device, a ransomware confirmation in response to the notification, the ransomware confirmation indicating a confirmation of the presence or an absence of the ransomware activity in the modified version of the file; and
        updating an operation of the detection of the ransomware activity based on the received ransomware confirmation.

11. The system of claim 10, wherein the modified version of the file is stored in a data structure in the cloud storage server, the data structure associated with the client device registered with the cloud storage server.

12. The system of claim 10, wherein the modified version of the file is a copy of a client-stored file stored at the client device.

13. The system of claim 10, wherein determining the features of the modified version of the file comprises:
    identifying an encryption status of the modified version of the file;
    identifying a file extension of the modified version of the file;
    identifying a content type of the modified version of the file; and
    identifying previous user feedback related to the modified version of the file.

14. The system of claim 13, wherein detecting the ransomware activity comprises:
    determining that the encryption status indicates that the modified version of the file is encrypted and that a previous version of the modified version of the file is unencrypted.

15. The system of claim 13, wherein detecting the ransomware activity comprises:
    determining that the file extension or a file name of the modified version of the file is indicative of the ransomware activity;
    determining that the content type of the modified version of the file does not correspond with content associated with the file extension of the modified version of the file; and
    determining the previous user feedback in response to previous ransomware notifications related to the modified version of the file.

16. The system of claim 15, wherein updating the operation of the detection of the ransomware activity further comprises:
    identifying at least one of a file name or the file extension as safe from the ransomware activity in response to the ransomware confirmation indicating the absence of the ransomware activity in the modified version of the file.

17. The system of claim 15, wherein updating the operation of the detection of the ransomware activity further comprises:
    identifying at least one of a file name or the file extension as safe from the ransomware activity in response to the ransomware confirmation indicating the absence of the ransomware activity in a client-stored file copy of the modified version of the file.

18. A machine-storage medium storing instructions that, when executed by one or more processors of a machine, cause the one or more processors to perform operations comprising:
    receiving, at a cloud storage server, a request from a client device to replace a file stored at the cloud storage server with a modified version of the file provided by the client device;
    replacing the file in a storage device of the cloud storage server with the modified version of the file in response to receiving the request;
    determining features of the modified version of the file at the storage device of the cloud storage server;
    detecting ransomware activity based on the features of the modified version of the file after replacing the file with the modified version of the file at the cloud storage server;
    generating a notification to the client device in response to detecting the ransomware activity, the notification indicating a presence of the ransomware activity in the modified version of the file, the notification including a request to confirm the presence of the ransomware activity in the modified version of the file;
    receiving, from the client device, a ransomware confirmation in response to the notification, the ransomware confirmation indicating a confirmation of the presence or an absence of the ransomware activity in the modified version of the file; and
    updating an operation of the detection of the ransomware activity based on the received ransomware confirmation.

* * * * *